MAGNETIC TRANSDUCING APPARATUS HAVING TRANSDUCER-ENGAGING DRIVE CAPSTAN WITH ELASTIC TIRE

Filed Sept. 22, 1967 4 Sheets-Sheet 1

March 10, 1970 SHIZUHIKO TANIGAWA ET AL 3,499,998

MAGNETIC TRANSDUCING APPARATUS HAVING TRANSDUCER-ENGAGING DRIVE CAPSTAN WITH ELASTIC TIRE

Filed Sept. 22, 1967 4 Sheets-Sheet 3

United States Patent Office 3,499,998
Patented Mar. 10, 1970

3,499,998

MAGNETIC TRANSDUCING APPARATUS HAVING TRANSDUCER-ENGAGING DRIVE CAPSTAN WITH ELASTIC TIRE

Shizuhiko Tanigawa, Moriguchi-shi, Toshio Shimizu and Mitsuru Ieki, Daito-shi, and Yutaka Higashida, Nishinomiya-shi, Japan, assignors to Matsushita Electric Industrial Co., Ltd., Osaka, Japan, a corporation of Japan Filed Sept. 22, 1967, Ser. No. 669,902
Claims priority, application Japan, Sept. 26, 1966, 41/63,949; July 6, 1967, 42/58,958, 42/58,959; July 7, 1967, 42/60,388; July 17, 1967, 42/62,369
Int. Cl. G11b *5/02*
U.S. Cl. 179—100.2 4 Claims

ABSTRACT OF THE DISCLOSURE

A magnetic recording and reproducing apparatus having a motor-driven cylindrical tape guide which is covered with a layer of non-transitional, adhesive elastic material so that a magnetic head forced against a magnetic tape along a Ω-like path about the tape guide is elastically withstood by the elastic material layer which acts as a cushion pad for the magnetic head. In the apparatus, the frictional force developed between the elastic material layer and the magnetic tape is principally utilized for driving the magnetic tape for thereby ensuring smooth travel of the magnetic tape in both the normal and reverse directions.

This invention relates to a magnetic recording and reproducing apparatus of a fixed head type and more particularly to a tape drive system for use in a magnetic recording and reproducing apparatus of the type described. More specifically, the present invention contemplates the provision of a tape drive system in which a layer of elastic material is provided to surround a rotatable cylindrical tape guide driven from a motor, and a magnetic tape is arranged to travel about the tape guide along a substantially Ω-like path so that the friction between the elastic material layer on the tape guide and the magnetic tape can be utilized to cause the travelling movement of the magnetic tape, and in which the magnetic head is brought into engagement with the tape guide through the magnetic tape so that the elastic material layer on the tape guide can serve as an elastic pad means behind the magnetic tape.

Prior tape drive systems for a magnetic recording and reproducing apparatus of the fixed head type have been such that a pinch roller is employed to force a magnetic tape onto a rotatable rigid capstan and frictional force developed between the rigid capstan and the magnetic tape is utilized to drive the magnetic tape. In the prior type drive system as described above, a method has been generally employed in which an annular groove is provided on the outer periphery of the rigid capstan and the magnetic head is engaged with the resilient magnetic tape at a position corresponding to the position of the annular groove on the rigid capstan in order to attain the smoothest contact between the magnetic head and the resilient magnetic tape. The above prior arrangement has been unsatisfactory when the magnetic tape must travel at a high speed relative to the magnetic head as, for example, in the case of the recordingand reproduction of a high-frequency signal such as a video signal. More precisely, in such a case, it is hard to expect satisfactory recording and reproduction of the video signal because a slight degree of eccentricity of the capstan is represented as a wow or flutter, and further, fine vibration due to the contact between the magnetic tape and the magnetic head is liable to take place. Moreover, with the prior arrangement as described above, in order to attain satisfactory recording and reproduction substantially free from the jitter and to permit recording of a plurality of tracks on the tape by reversing the travelling direction of the tape for the switch-over of the tracks, some means including two capstans and a magnetic tape as a closed loop system must be employed to eliminate possible tape vibration and irregular tape travel, and realization of these means requires a mechanism of a complex structure.

It is therefore the primary object of the present invention to eliminate these defects involved in the prior tape drive system in conventional magnetic recording and reproducing apparatus and to provide a novel and improved magnetic recording and reproducing apparatus having a tape drive system of a simple structure which ensures a stable tape travel, gives an excellent buffering action at the contact part between a magnetic head and a magnetic tape, and can easily reverse the direction of travel of the magnetic tape.

The above and other objects, advantage and features of the present invention will become apparent from the following description with reference to the accompanying drawings, in which.

Figure 1:
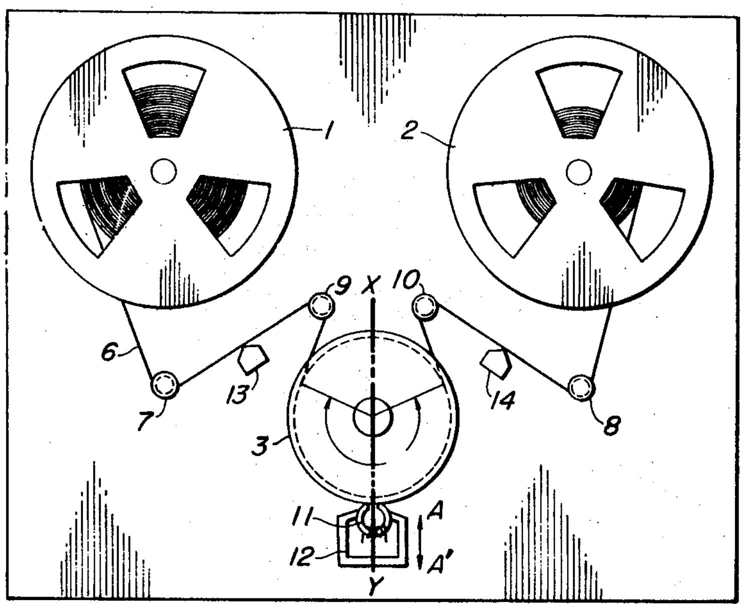
FIG. 1 is a schematic plan view of an embodiment of the magnetic recording and reproducing apparatus according to the present invention.
Figure 2:
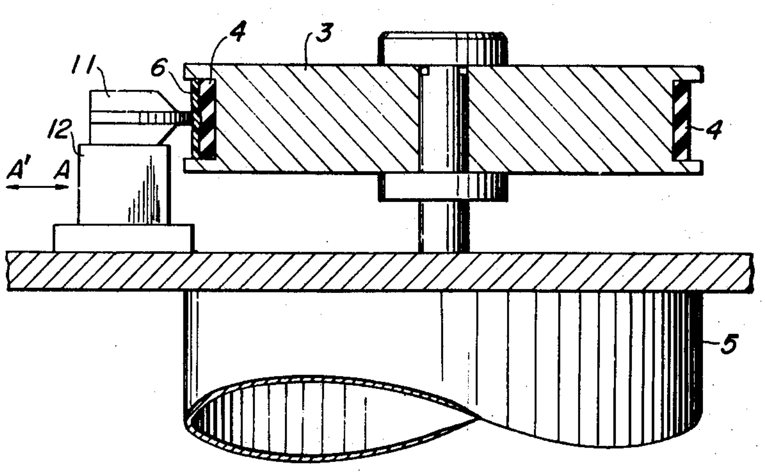
FIG. 2 is an enlarged sectional view taken on the line X–Y in FIG. 1.

Referring first to FIGS. 1 and 2, the magnetic recording and reproducing apparatus according to the invention comprises a tape supply reel 1, a tape take-up reel 2, and a rotatable cylindrical tape guide 3 having provided on its outer periphery a layer of elastic material 4 of non-transitional and adhesive natures having a composition as will be described in detail later. The cylindrical tape guide 3 is equipped with a flywheel (not shown) and is drivingly connected with a motor 5.

A magnetic tape 6 supplied from the tape supply reel 1 is fed past a tape guide post 7, and a tape guide roller 9 disposed in the vicinity of the rotatable tape guide 3 to run along the substantial portion of the outer periphery of the tape guide 3 in a Ω-like manner, and is then fed past a tape guide roller 10 disposed in the vicinity of the tape guide 3 and past a tape guide post 8 to be taken up on the tape take-up reel 2. A magnetic head 11 for the recording and reproduction of a video signal is disposed in such a manner that it diametrically engages through the magnetic tape 6 with the rotatable tape guide 3 as best shown in FIG. 2. The magnetic head 11 is mounted on a support block 12 which is movable in the diametral direction of the magnetic head 11 or in a direction A–A'. An erasing head 13 and an audio head 14 are fixedly disposed in the path of the magnetic tape 6.

It will be understood that the magnetic head 6 is driven in an integral and intimate contact relation with the rotatable tape guide 3 by the adhesive frictional force proluced between the magnetic tape 6 and the non-transi-ional, adhesive, elastic material layer 4 on the rotatable ape guide 3. Since, in accordance with the present inven-ion, the arrangement is such that the recording and re-›roducing magnetic head 11 engages the magnetic tape 6 ıt a position substantially central of the angle $\theta$ corre-ponding to the arcuate contact path of the magnetic tape › along the tape guide 3, any irregularity in the traveling tate of the magnetic tape 6 that may result from $\alpha$ dis-ortion of the tape supply and take-up reels 1 and 2, tape wing, irregular tape tension, etc. can be sufficiently ab-orbed by the tape guide 3, and stable recording and re-›roduction can always be insured.

It will be further noted that the elastic material layer ł covering the periphery of the tape guide 3 is elastically ırged slightly inwardly by being engaged by the magnetic ıead 11 as shown in FIG. 2 and thus serves as an elastic ›ad means. Experimentally, good results could be ob-ained when the concavity in the elastic material layer 4 ›roduced by the engagement between the magnetic head .1 and the magnetic tape 6 was in the order of 50 mi-rons. By virtue of the above elastic effect, an optimum ›ressure of 40 to 60 grams can be imparted to the mag-ıetic head 11, and the eccentricity error (in the order of ; microns according to experiments) inevitably resulting rom machining on the tape guide 3 can thereby be com-›ensated sufficiently.

The non-transitional, adhesive, elastic material layer 4 ıaving a high flexibility, elasticity and coefficient of fric-ion preferably employed in the invention to give good esults may be made by treating and denaturing such naterial as synthetic rubber, natural rubber, or a thermo-›lastic or thermo-setting high-molecular compound. The erm nontransitional is meant to define that quality of naterial such that the material is elastic and adhesive ›ithout being transferable to the tape during said adhe-ion.

A few examples of such non-transitional, adhesive, elas-ic material will be given hereunder.

EXAMPLE 1

Silicon rubber (made by the Shinetsu Kagaku Com-ıany under the trade name KE–961 U) was masticated or 5 minutes at room temperature, and then benzoyl per-›xide in an amount of 0.3 phr. was added to the silicone ubber as a vulcanizing agent. The composition was then horoughly mixed for 5 minutes by use of mixing rolls, .nd was poured into a metal mold, in which the compo-ition was vulcanized for 15 minutes at a temperature of 20° C. under application of a pressure of 30 kilograms ›er square centimeter to make a silicone rubber ring. The ilicone rubber ring thus obtained was then subjected to ıeat treatment for 1 hour at 150° C., 1 hour at 200° C. .nd 16 hours at 250° C. in air to complete the ring.

EXAMPLE 2

Crude chloroprene rubber in an amount of 500 grams ›as masticated for 10 minutes using hot rolls heated to ›0° C., and then vulcanizing the ingredients which were inc white in an amount of 25 grams, magnesia in an mount of 20 grams, and phenyl-$\beta$-naphthylamine in an mount of 10 grams, an adhesive which was cumarone esin in an amount of 75 grams, and a filling material ›hich was calcium silicate in an amount of 100 grams ›ere added to the chloroprene rubber. After thoroughly ıixing the above composition, the composition was ›oured into a metal mold and was vulcanized for 30 min-ıtes at a temperature of 155° C. under a pressure of 10 :ilograms per square centimeter to obtain a ring.

EXAMPLE 3

A polysulfide (sold under the trade name of Thiokol .P–3) in an amount of 300 grams was thoroughly mixed ›ith an additive which was diethylene triamine in an mount of 10 grams. An epoxide resin (sold under the trade name of Epkote 828) in an amount of 100 grams was added to and thoroughly mixed with the above composition. The composition was poured into a ring-making metal mold and was hardened for 2 hours at 70° C. The hardened composition was then removed from the metal mold to complete the ring.

It will be understood from the inventive arrangement that a great frictional force is developed between the tape guide 3 and the magnetic tape 6 because the tape 6 travels past the tape guide 3 along a substantially $\Omega$-like path. In the case, for example, of the elastic material layer in the form of a ring made according to Experiment 1, a coefficient of friction of 0.2 was observed between the base surface (non-coated surface) of the magnetic tape made from a polyester base material and the above-described highly frictional, elastic material when a force of 100 grams was applied to the magnetic tape by the magnetic head.

Figure 10:
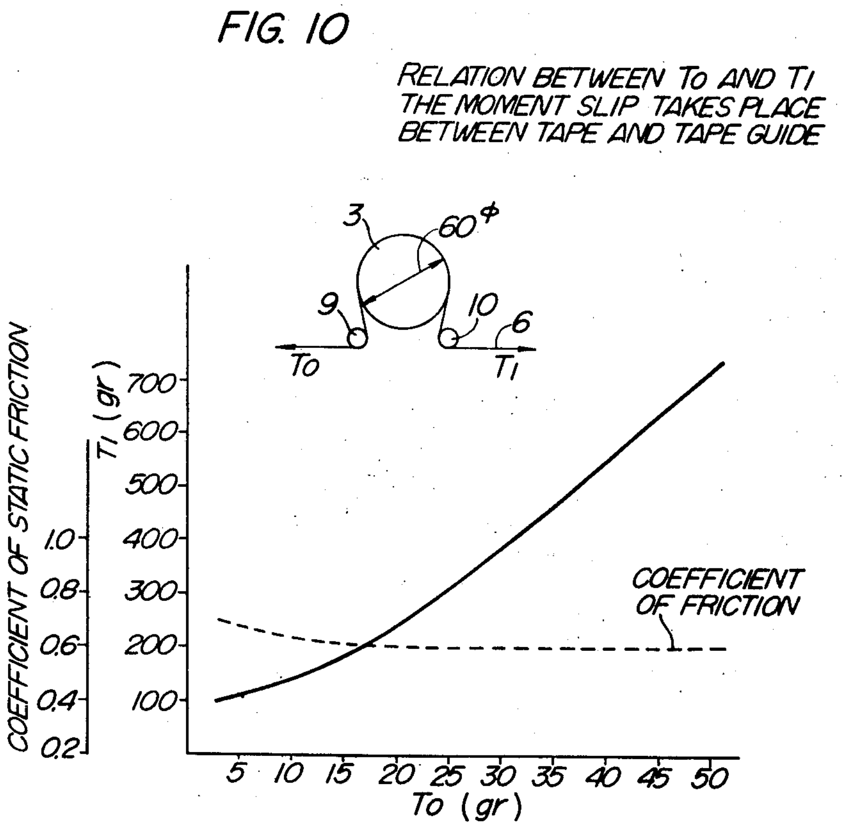
FIG. 10 is a graphic illustration of the relation between the back tension and the take-up tension on the magnetic tape at the moment when a slip takes place between the magnetc tape and the tape guide in the magnetic recording and reproducing apparatus according to the present invention.

The relation between the back tension and the take-up tension on the magnetic tape at the moment when a slip takes place between the magnetic tape and the tape guide is graphically shown by a solid line in FIG. 10. As will be apparent from FIG. 10, the slip would not take place until the tape take-up tension $T_1$ becomes as high as about 400 grams assuming that the minimum value of the back tension $T_0$ is 30 grams. Since, in common magnetic recording and reproducing apparatus, the back tension $T_0$ and the take-up tension $T_1$ generally lie in respective ranges of 30 to 140 grams and 50 to 150 grams, the tape can be satisfactorily driven without any possibility of a slip as far as these tensions lie in the above-specified ranges.

Figure 3:
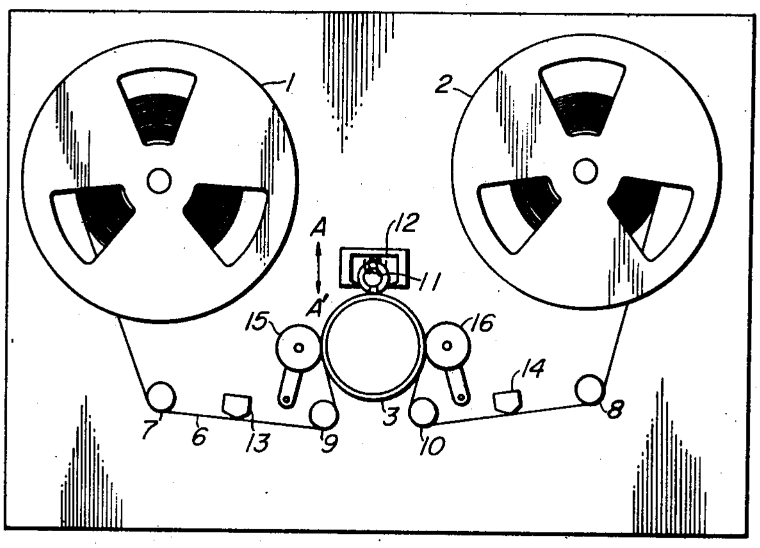
FIG. 3 is a schematic plan view of another embodiment of the magnetic recording and reproducing apparatus according to the present invention.

In accordance with another embodiment of the invention shown in FIG. 3, a pair of pinch rollers 15 and 16 are provided in a symmetrical relation with respect to the line X–Y connecting the diametrical line of the magnetic head 11 with the center of the tape guide 3. The provision of the pinch rollers 15 and 16 is effective to prevent the formation of an air film between the tape guide 3 and the magnetic tape 6 running at a high speed and to compensate for any reduction of the coefficient of friction due to the presence of foreign matters or the like on the tape guide surface for thereby further increasing the tape drive force.

It will further be noted that the symmetric arrangement of the tape drive system of the invention with respect to the diametrical line of the magnetic head 11 permits an easy reversing of the direction of travel of the magnetic tape 6. The reversing of the travelling direction of the tape can be easily effected in the system provided with the pinch rollers as well as in the system without the provision of the pinch rollers by merely reversing the direction of rotation of the tape guide 3.

Figure 4:
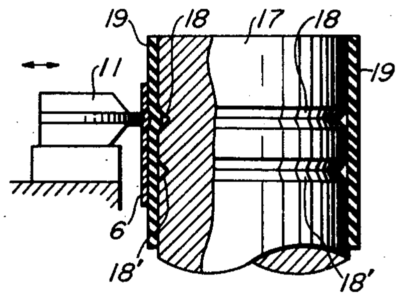
FIGS. 4, 5, 6, 7 and 8 are axial sectional views showing various other forms of the tape guide employed in the apparatus shown in FIG. 1.

In FIG. 4 there is shown another form of the tape guide preferably used in the apparatus according to the present invention. The tape guide shown in FIG. 4 comprises a cylindrical member 17 of metal or like rigid material having a plurality of annular cutouts or grooves 18 and 18' provided on the outer periphery thereof, and a layer of elastic material 19 such as silicon rubber which covers the entire outer periphery of the cylindrical member 17 in a manner to leave therebetween annular spaces or gaps defined by the grooves 18 and 18'. The tape guide shown herein cooperates with the magnetic head 11 in such a way that the magnetic head 11 engages the tape guide through the magnetic tape 6 at such portion corresponding to any one of the annular grooves 18 and 18'. The elastic material layer 19 may preferably have a thickness of 1 to 1.5 millimeters, and the provision of the annular grooves 18 and 18' is so effective as to give the optimum contact pressure between the magnetic tape 6 and the magnetic head 11 and to further improve the durability of the elastic material.

Figure 5:
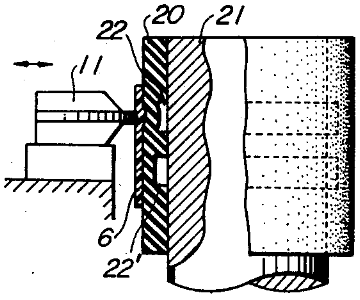

In FIG. 5 there is shown still another form of the tape guide preferably used in the apparatus according to the present invention. The tape guide shown in FIG. 5 comprises a cylindrical member 21 of metal or like rigid material, and a layer of elastic material 20 such as silicone rubber which covers the entire outer periphery of the cylindrical member 21 and has a plurality of annular cutouts or grooves 22 and 22' on the inner surface portion thereof contacting the outer peripheral surface of the cylindrical member 21. The tape guide shown herein cooperates with the magnetic head 11 in such a way that the magnetic head 11 engages the tape guide through the magnetic tape 6 at such portion corresponding to any one of the annular grooves 22 and 22'. The manner of contact between the magnetic tape 6 and the magnetic head 11 in the present form of the tape guide is similar to that in FIG. 4, and a satisfactory contact therebetween can be attained because of the fact that the grooved portion of the elastic material layer 20 at which the magnetic head 11 engages the magnetic tape 6 has a higher elasticity than the remaining non-grooved portion of the elastic material layer 20.

Figure 6:
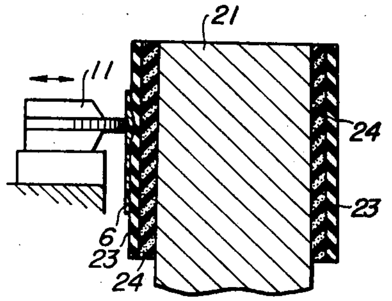

A further form of the tape guide shown in FIG. 6 comprises a cylindrical member 21 of metal or like rigid material, and a plurality of layers 23 and 24 of elastic materials covering the entire outer periphery of the cylindrical member 21. The layers 23 and 24 are formed from elastic materials having different moduli of elasticity and are stacked in such a way that the outer layer 23 has a higher modulus of elasticity than that of the inner layer 24. It will be seen in FIG. 6 that the magnetic head 11 is forced against the magnetic tape 6 into these elastic material layers 23 and 24 covering the cylindrical member 21.

Figure 7:
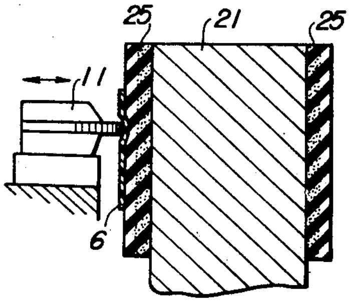

FIG. 7 represents a case in which a plurality of elastic material layers as shown in FIG. 6 are replaced by a single layer 25 which is molded in a manner that the modulus of elasticity becomes successively lower from the outermost surface toward the innermost surface. Some examples of the method of making such an elastic material layer having successively varying moduli of elasticity will be described hereunder.

EXAMPLE 1

A silicone rubber compound (made by Shinetsu Kagaku Company under the trade name KE–961 U) in an amount of 100 grams was masticated for 5 minutes at room temperature by use of rubber mixing rolls rotating at a ratio of 1:1.4. Then, t-butyl-peroxybenzoate in an amount of 1.0 gram and p-toluene sulfonyl hydrazide in an amount of 5 grams were added to the silicone rubber compound and thoroughly mixed together to effect a sufficient dispersion of the additives in the silicone rubber compound. The unvulcanized rubber so obtained was poured into a metal mold in a manner that the rubber filled about one-half of the volume of the cavity in the metal mold, and vulcanization was performed for 150 minutes at a temperature of 150° C. under application of a pressure of 10 kilograms per square centimeter. The molded product obtained in the above manner had a smooth outer surface and a multiplicity of independent foams in the interior thereof. The product had a specific gravity of 0.7 with a foaming percentage of 100 and showed a hardness of 38 when measured in accordance with the Japanese Industrial Standards.

EXAMPLE 2

Polychloroprene rubber (made by Du Pont Company under the trade name Neoprene W) in an amount of 100 grams was masticated for 30 minutes at a constant temperature of 30° C. Then, 5 grams of zinc oxide, 3 grams of magnesium oxide, 0.3 gram of 2-mercaptobenzimidazoline, 2 grams of stearic acid, 1 gram of sulfur,, 2 grams of aromatic oil, 40 grams of carbon black, and 5 grams of paratoluene sulfoazide were added to the polychloroprene rubber and thoroughly mixed together for about 20 minutes by use of mixing rolls. The unvulcanized compound so prepared was then poured into a metal mold and the foam-molding operation was made to obtain a foamed, molded product having a smooth outer surface. The vulcanization treatment was conducted for 45 minutes at a temperature of 140° C. The molded product had a specific gravity of 0.6 and showed a hardness of 40 when measured in accordance with the Japanese Industrial Standards.

The products made from the above materials under the processes as described above give useful means when incorporated as the elastic covering for the tape guide in the apparatus according to the invention since the required diametral precision of the elastic covering can easily be attained and the optimum pressure of the order of 40 to 60 grams to be imparted to the magnetic head 11 can satisfactorily be obtained. It will be understood from the above examples that the structure of the lastic covering as shown in FIGS. 6 and 7 in which the outer elastic layer 23 has a required surface hardness and the inner elastic layer 24 has a lower modulus of elasticity than that of the outer elastic layer 23, or the single elastic layer 25 has the highest modulus of elasticity at the outermost surface engaged by the magnetic tape and a successively lower moduli of elasticity toward the innermost surfaces contacting the cylindrical member 21, can exhibit an effect similar to that exhibited by the structure shown in FIGS. 4 and 5, and the tape guide having such a structure is quite suitable for use in apparatus adapted for multi-channel recording and reproduction.

Figure 8:
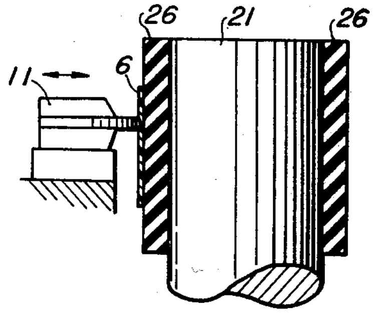
Figure 9:
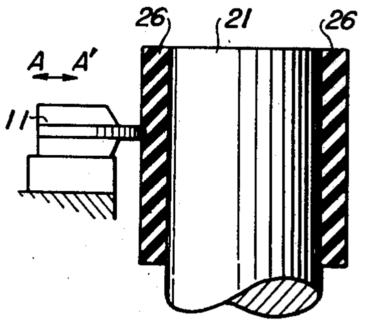
FIG. 9 is an axial sectional view showing another operating state of the tape guide shown in FIG. 8.

A still further form of the tape guide shown in FIG. 8 comprises a cylindrical member 21 of metal or like rigid material, and a layer 26 of elastic material provided to surround the entire periphery of the cylindrical member 21, the elastic material layer 26 being molded from a mixture of an elastic material and a magnetic head grinding material or an abrasive material so that the magnetic head 11 may be directly engaged with the elastic material layer 26 when grinding and cleaning of the magnetic head 11 is required. In the recording and reproduction of a high-frequency signal such, for example, as a video signal, the repeated travel of the magnetic tape due to a high relative velocity requirement between the magnetic tape and the magnetic head results in roughening of the engaging face of the magnetic head with the magnetic tape as well as the head gap face of the magnetic head, seizure and deposition of the tape coating material on the magnetic head, and deposition of dust on the magnetic head, and these undesirable phenomena unavoidably lead to a reduction of the magnetic head output and a lowering of other performances of the magnetic head.

The structure of the elastic covering shown in FIG. 8 is effective to deal with the above situation so that the engaging face of the magnetic head can thereby be easily ground and cleaned. More precisely, the elastic material layer 26 in FIG. 8 takes the form of an annular sleeve which is mounted to cover the outer periphery of the rigid cylindrical member 21 of metal or like material. The annular sleeve 26 is formed from a flexible and elastic material obtained by processing and denaturing a thermoplastic high molecular compound including synthetic rubber or natural rubber. In the above process, fine particles of an abrasive material used for the magnetic head grinding work such as chromium oxide or silicon carbide pulverized to 6,000 meshes are added in an amount of about 10% by weight to the elastic material and molded together to provide the elastic sleeve 26.

In the normal recording and reproducing operation, the magnetic head 11 engages through the magnetic tape 6 with the tape guide and good contact between the magnetic head 11 and the magnetic tape 6 is ensured by the elasticity of the interposed elastic material layer 26. On the other hand, in the grinding and cleaning operation on the head face of the magnetic head 11, the magnetic head 11 is brought into direct engagement with the elastic material layer 26 of the tape guide, and the tape guide is rotated to automatically grind and clean the engaging face of the magnetic head 11. It will be noted that the engaging face of the magnetic head can be ground and cleaned with the highest efficiency because such face of the magnetic head 11 is ground under a state almost analogous to the state encountered in the recording and reproducing operation.

It is to be added herein that the elastic materials in FIGS. 4, 5 and 7, and the outer elastic material in FIG. 6 may be made according to the form of the non-transitional, adhesive, elastic material referred to above so that a more stabilized tape travel can be realized by virtue of the highly frictional property developed by the layer of such elastic material.

We claim:

1. A magnetic recording and reproducing apparatus comprising a rotatable cylindrical tape guide having a central cylindrical member of rigid material and a layer of nontransferable, adhesive, elastic material having a high coefficient of friction covering the entire outer periphery of said cylindrical member, a drive source connected to rotate said cylindrical tape guide, means for driving a magnetic tape along a substantially Ω-like path about said cylindrical tape guide, and a magnetic head adapted to be pressed against said magnetic tape into said elastic material layer of said cylindrical tape guide.

2. A magnetic recording and reproducing apparatus comprising a rotatable cylindrical tape guide having a central cylindrical member of rigid material having a plurality of annular grooves formed on the outer periphery thereof and a layer of elastic material covering the entire outer periphery of said cylindrical member leaving annular spaces at portions corresponding to the positions of said annular grooves, a drive source connected to rotate said cylindrical tape guide, means for driving a magnetic tape along a substantially Ω-like path about said cylindrical tape guide, and a magnetic head adapted to be forced against said magnetic tape into said elastic material layer of said cylindrical tape guide at a position corresponding to one of said annular grooves.

3. A magnetic recording and reproducing apparatus comprising a rotatable cylindrical tape guide having a central cylindrical member of rigid material and a layer of elastic material covering the entire outer periphery of said cylindrical member, said elastic material layer having a plurality of annular grooves formed on a portion of the surface contacting said cylindrical member, a drive source for rotating said cylindrical tape guide, means for driving a magnetic tape along a substantially Ω-like path about said cylindrical tape guide, and a magnetic head adapted to be forced against said magnetic tape into said elastic material layer of said cylindrical tape guide at a position corresponding to one of said annular grooves.

4. A magnetic recording and reproducing apparatus comprising a rotatable cylindrical tape guide having a central cylindrical member of rigid material and a layer of elastic material containing therein a powdery hard abrasive material and covering the entire outer periphery of said cylindrical member, a drive source for rotating said cylindrical tape guide, means for driving a magnetic tape during the recording and reproducing operation along a substantially Ω-like path about said cylindrical tape guide, and a magnetic head so disposed that it is forced against said magnetic tape into said elastic material layer of said cylindrical tape guide during the recording and reproducing operation and that it is directly forced into said elastic material layer of said cylindrical tape guide for the purpose of grinding and cleaning of the engaging face of said magnetic head.

References Cited

UNITED STATES PATENTS

| | | | |
|---|---|---|---|
| 2,535,480 | 12/1950 | Begun | 179—100.2 |
| 2,735,899 | 2/1956 | Essel | 179—100.2 |
| 2,819,349 | 1/1958 | Hall | 179—100.2 |
| 2,862,845 | 12/1958 | Szegvari | 179—100.2 |
| 2,998,906 | 9/1961 | Vice et al. | 226—190 |
| 3,157,868 | 11/1964 | Buslik | 179—100.2 |
| 3,218,440 | 11/1965 | Albosta | 179—100.2 |
| 3,381,965 | 5/1968 | Browder | 179—100.2 |
| 3,402,868 | 9/1968 | Hammond | 226—190 |
| 2,466,030 | 4/1949 | Landau | 51—135 |
| 3,069,815 | 12/1962 | Valentine | 179—100.2 |

BERNARD KONICK, Primary Examiner

J. P. MULLINS, Assistant Examiner

U.S. Cl. X.R.

226—191